US005323256A

United States Patent [19]

Banks

[11] Patent Number: 5,323,256

[45] Date of Patent: Jun. 21, 1994

[54] APPARATUS FOR CONTROLLING REMOTE SERVOACTUATORS USING FIBER OPTICS

[76] Inventor: Franklin J. Banks, 1724 Aldersgate, Leucadia, Calif. 92024

[21] Appl. No.: 863,740

[22] Filed: Apr. 6, 1992

[51] Int. Cl.[5] ........................ H04J 14/02; H04B 10/24

[52] U.S. Cl. .................................... 359/147; 359/124; 359/144; 359/143; 340/870.12; 340/870.28

[58] Field of Search ............... 359/124, 133, 143, 144, 359/147, 128; 340/870.12, 870.28, 825.06

[56] References Cited

U.S. PATENT DOCUMENTS

| | | | |
|---|---|---|---|
| 3,924,120 | 12/1975 | Cox | 359/144 |
| 4,253,192 | 2/1981 | Conally | 340/870.28 |
| 4,390,974 | 6/1983 | Siems | 359/144 |
| 4,420,840 | 12/1983 | Livermore | 359/144 |
| 4,942,568 | 7/1990 | Khoe | 359/133 |
| 4,998,294 | 3/1991 | Banks | 359/144 |

*Primary Examiner*—Leslie Pascal

*Attorney, Agent, or Firm*—Frank D. Gilliam

[57] ABSTRACT

A fiber optic servoactuator control system. The system includes an actuator optical interface having light controlled electric switches for servoactuator control and for control of a solenoid and an optical modulator, all connected to a single optical fiber. The fiber is connected at its second end to a computer optical interface having three light emitters and a detector optically coupled into the single optical fiber. Only the single optical fiber and a pair of electric wires run between these two interfaces. The wires carry alternating and direct current to the actuator to power the device actuated, such as a servovalve. This system typically can be applied to the control of aircraft engines, primary flight controls, machine tools, ships and the like. The system is resistant to electromagnetic interference and pulses. The actuator may be located in a high temperature hostile environment, such as an aircraft engine.

10 Claims, 1 Drawing Sheet

APPARATUS FOR CONTROLLING REMOTE SERVOACTUATORS USING FIBER OPTICS

BACKGROUND OF THE INVENTION

This invention relates in general to servoactuator control systems and, more specifically, to an apparatus for computer control of remote servoactuators using a fiber optic information transmission system between a servoactuator interface and its controlling computer system.

A variety of different systems are used to operate, measure the position of, and control remote actuators, such as servoactuators, servovalves, solenoid valves and other servomechanisms. In aircraft, ships, machine tools and other applications these functions have generally been accomplished by hydraulic operating systems or mechanical linkages. While effective, these systems are heavy, occupy considerable space. Providing redundant control paths for safety is also quite difficult.

Recently, systems have come into use that use electrical signals passing through wires from input or control devices to the device, such as a flight control system, valve or the like. These so called "fly-by-wire" systems have come into widespread use in military aircraft and missiles. However, these systems are complex, a conventional electrically wired system requiring, typically, a servovalve, an actuator, valve position sensors and servovalve current sensing. Often, more that 25 conductors with attendant shielding is required. The weight, complexity, opportunity for breaks in wires or short circuits in these systems are significant problems. Also, these wired systems are subject to power failures, electromagnetic interference (EMI) from other nearby wiring or electrical devices and are subject to damage from electromagnetic pulses (EMP). There is a particular need to overcome these problems in military aircraft, missiles and ships as well as in numerical controlled machine tools and any other situation where EMI and EMP can be serious problems.

Considerable interest has developed in using optical fiber systems for remote control applications and for transmitting information rapidly and accurately over long distances. Fiber optics have many of the advantages of the fly-by-wire systems while being impervious to electrical shorts, EMI and EMP. Typical fiber optic control systems are disclosed by Sichling in U.S. Pat. No. 4,346,378 and Blackington in U.S. Pat. No. 4,313,226. While often effective, these systems tend to be electrically and optically complex with the mechanisms for measuring and controlling actuator position and transmitting corresponding optical signals being less than fully effective.

Thus, there is a continuing need for improved accurate, simple and effective servoactuation systems capable of accurately measuring the position of an actuator, reporting that position to a central computer interface and changing or correcting the actuator position as needed.

SUMMARY OF THE INVENTION

It is, therefore, an object of this invention to provide a fiber optic servoactuator system overcoming the above-noted problems. Another object is to provide a fiber optic servoactuator system having lower weight and cost than prior systems. A further object is to provide a fiber optic servoactuator system that is resistant to EMI and EMP. Yet another object is to provide a fiber optic servoactuator system that can operate in high temperature, hostile environments.

The above-mentioned objects, and others, are accomplished in accordance with this invention by a fiber optic servoactuator control system which comprises a servoactuator optical interface having optically controlled electric switches for servoactuator control and, preferably, one optically controlled electric switch for control of a solenoid valve. Thus, the system may selectively control proportionally positioned servoactuators such as aircraft flight control systems or servovalves, or on-off devices such as solenoid valves. Signals may be multiplexed with this system.

The servoactuator interface receives all control signals through a single optical fiber, that typically runs from a central computer bay to the location of the servoactuator, which may be in a high temperature, hostile, environment such as an aircraft engine.

At the second end of the optical fiber, at the low temperature computer location, the single optical fiber is connected to a computer optical interface having four light emitters and a detector optically coupled with the optical fiber. A single twisted pair of wires also extends from the servoactuator location to an electrical power supply that carry alternating and direct current, as required, to power the servoactuator being controlled.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figures 1, 2:
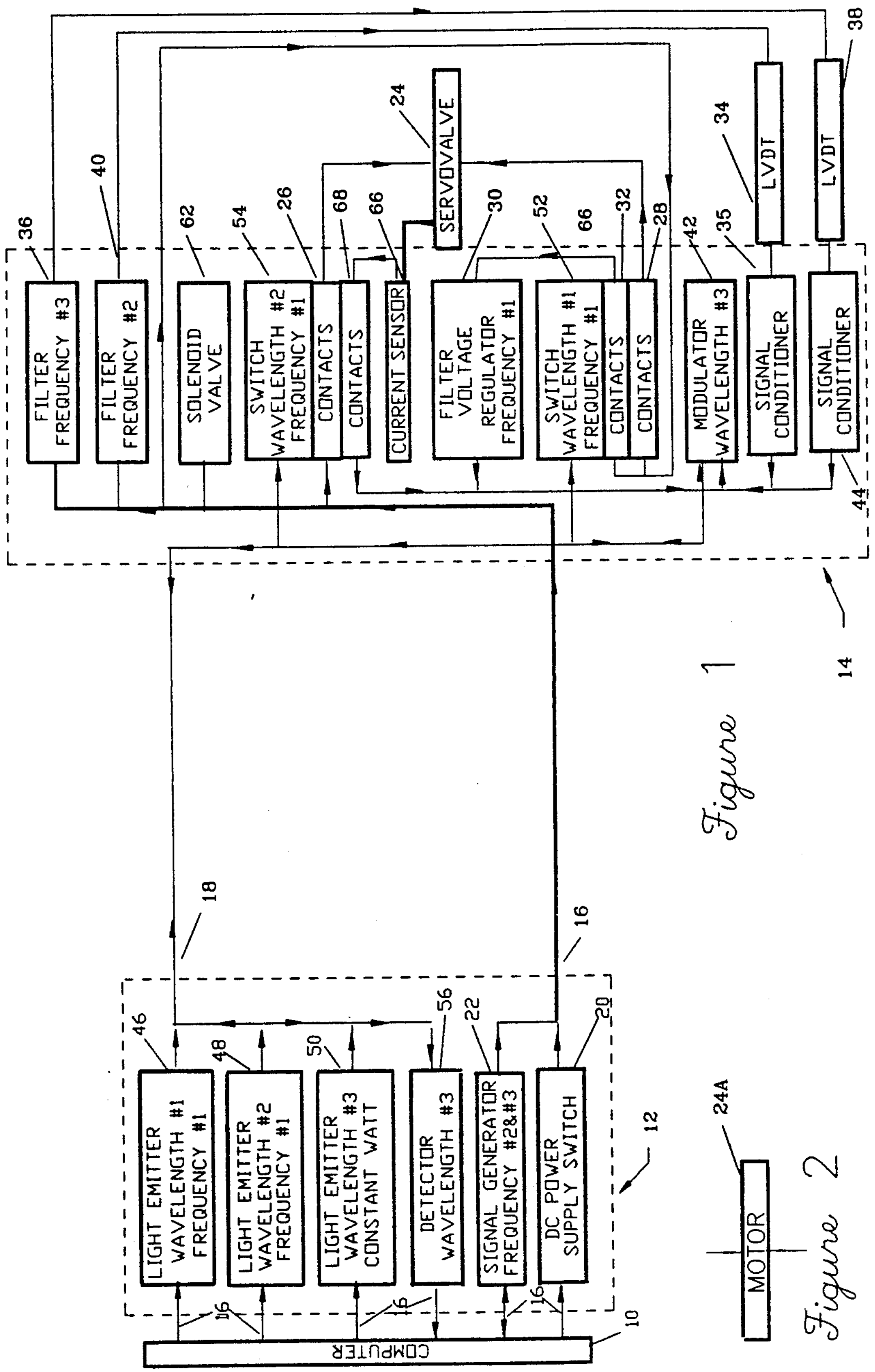
FIG. 1 is a schematic block diagram of the fiber optic and electrical systems for control of a servoactuator in accordance wit this invention and FIG. 2 is a showing of an electrical motor as the servoactuator.

Referring now to the drawing Figures, In FIG. 1 there is seen a schematic block diagram basically made up of three main subsystems, a computer 10 connected to a computer interface assembly 12, which is in turn connected to a servoactuator interface assembly 14 through a single pair of twisted wires 16 and single fiber optic 18. For convenience in following the connections, electrical wires are shown in heavier lines than are the optical fibers.

In practice, computer 10, which may operate many systems of the sort shown in addition to various other systems in a conventional manner, and computer interface 12 will be located at a single, environmentally benign, location such as a computer bay or aircraft cockpit area, while servoactuator interface 14 will be located at the actuator location or in the actuator package, which may typically be the location of a flight control device such as an aircraft flap or aileron or an engine control. These actuator locations may be at high temperatures or otherwise be environmentally harsh. While only a single fiber optic 18 and pair of electrical wires 16 need be run between the interface locations, if desired redundant fiber optics and wires may be run along widely separated paths to avoid loss of control should damage occur to one or more fiber optics or wires. Only a single pair of twisted wires and single fiber optic is required to retain complete control.

In typical systems, the servoactuators may each include a servovalve, an actuator position sensor, a valve position sensors and servovalve current sensors. In some cases, a solenoid valve is also required.

The servovalve or other device may be have electrical, as shown in drawing FIG. 2, pneumatic or hydraulic power, as shown in drawing FIG. 1. Computer 10, may be any conventional flight control computer or the like, such as a Lear Astronautics ALH computer system. The Figure shows a preferred system using one servovalve, one solenoid valve, one actuator Linear Variable Differential (position) Transformer (LVDT), one servo valve LVDT and a computer for controlling the servoactuator and sensing of valve current.

A direct current power switch 20 supplies direct current power to the servoactuator. Signal generator 22 delivers alternating current power at selected second and third frequencies. A single pair of twisted wires 16 connect signal generator 22 and power switch 20 to servoactuator interface 14. Direct current is delivered directly to solenoid valve 62 and also to servovalve 24 via contacts 26 and 28 and to voltage regulator 30 via contacts 32. Contacts 26 and 28, and other contacts mentioned below, may be FET's if desired. The second frequency is delivered via bandpass filter 36 from signal generator 22 to actuator position LVDT primary 34, then via signal conditioner 35 to modulator 42. The third frequency is delivered from signal generator 22 to valve position LVDT 38 via bandpass filter 40, then to modulator 42 via signal conditioner 44.

Any suitable conventional LVDT may be used in this system. Typical LVDT's include the L301C6M available from Kavlico. Typically, each LVDT is a cylinder with a hollow core with a rod (usually a wire) for moving a magnet through the hollow core to sense position. Around the hollow core are provided a primary winding and two secondary windings. The secondaries are wound with increasing turns per inch from end to end to provide voltage gain. The taper between windings is opposed. Their sum is constant with position and their difference is a function of position. The difference/sum is a function of position and are linear and constant with amplitude variations.

The signal conditioners 35 and 44 receive signals from the secondaries of LVDT's 34 and 38, respectively, at the frequency that is applied to the LVDT primaries and at individual amplitudes as a function of LVDT sensed position. Any conventional signal conditioning technique may be used. The signal conditioners shift the phase of the two frequencies 45° and 90° from each other. When the two phases are resolved their resultant phase relation to the primary frequency (signal generator 22) is a function of LVDT sensed position.

Alternatively, the signal conditioners could sense each LVDT secondary separately at individual frequencies. The LVDT primary is excited with two frequencies; notch filters at the secondary would allow only one of the frequencies to pass each secondary.

Light signals at first, second and third selected wavelengths are produced by light emitters 46, 48 and 50, respectively, under control of computer 10. The light emitters may be conventional light emitting diodes or lasers operating at selected wavelengths. The three light signals pass through single optical fiber 18 to optical switch 52 which responds to said first wavelength, optical switch 54 which responds to said second wavelength and to modulator 42 which utilizes said third wavelength.

Each of the optical switches 52 and 54 and modulator 42 includes a bandpass filter to control wavelength response to the selected wavelength. Switches 52 and 54 contain an electro-optic power cell of the sort disclosed in my U.S. Pat. No. 5,043,573, and switches of the sort disclosed in my U.S. Pat. No. 4,998,294, the disclosures of which are hereby incorporated by reference.

Modulator 42 attenuates the optical power received as a function of applied voltage and returns the attenuated light into fiber 18 for detection at detector 56 at the third wavelength. Typically, modulator 42 operates in the manner detailed in my U.S. Pat. No. 4,950,884, the disclosure of which is hereby incorporated by reference.

A neutral biased servovalve 24, 24A is typically used for aircraft flight controls. Positive current flow causes actuator motion in the positive direction and negative current flow causes motion in the negative direction. Switch 52 delivers positive current flow to servovalve 24, 24A and switch 54 delivers negative current to servovalve 24, 24A.

Alternatively, with applications requiring a fully biased servovalve, switch 52 can deliver pulsewidth modulated current to servovalve 24, 24A and switch 54 can be eliminated or used to control a solenoid valve 62, which may required in such applications.

The optical bandpass filter in switch 52 allows light transmission at said first wavelength, from light emitter 46, and rejects the second and third wavelengths from light emitters 48 and 50. The bandpass filter in switch 54 allows light transmission at said second wavelength, from light emitter 48, and rejects the first and third wavelengths from light emitters 46 and 50. Electric power applied to light emitter 46 from computer 10 is conducted as light power via fiber 18 to switch 52 which closes contacts 26 and conducts electric power from power source 22 via wire 16 to servovalve 24, 24A. Pulsewidth modulation of the electric power at said first frequency causes current to be applied to servovalve 24, 24A in proportion to the pulse width. Pulsewidth modulation of electric power supplied to light emitter 48 by computer 10 at said first frequency delivers current to servovalve 24, 24A of opposite polarity to that resulting from light emitter 46.

Sensing of the position of a servovalve 24,24A or other servoactuator is accomplished as follows. The second frequency is conducted from signal generator 22 to LVDT primary 34 via wire 16 and filter 36. Filter 36 passes said second frequency and rejects said second frequency and DC power. The secondary of LVDT 34 and signal conditioner 35 receives said second frequency and conditions the phase. The phase conditioned signal is conducted to modulator 42.

The third frequency is conducted to the primary of LVDT 38 via wire 16 and filter 40 from signal generator 22. Filter 40 passes the third frequency and rejects said second frequency and DC power. The secondary of LVDT 38 and signal conditioner 44 receives the third frequency and conditions the phase. The phase conditioned signal is conducted to modulator 42.

Light from emitter 50 at the third wavelength is conducted by fiber 18 to modulator 42. The voltage from signal conditioners 35 and 44 applied to modulator 42 cause a corresponding light signal to be conducted by the fiber to detector 56. Detector 56 responds to said third wavelength at the second and third frequencies and rejects the first and second wavelengths. The signal from detector 56 is conducted to computer 10 for resolution. Computer 10 bandpass separates the first, second and third frequencies for resolution.

Computer 10 conditions and resolves the second frequency by comparing the phase received from detector 56 with the phase of said second frequency at signal generator 22. The resolved phase difference is a function of actuator position.

Computer 10 conditions and resolves the third frequency by comparing the phase received from detector 56 with the phase of the third frequency at signal generator 22. The resolved phase difference is a function of servovalve position.

Servovalve current is sensed as follows. The servovalve current is sensed as a function of the voltage drop across a load resistor in current sensor 66 in series with servovalve 24. The resistor voltage drop is conducted via contacts 68 in switch 54 to modulator 42 at said first frequency (which is generated by contacts 68) and at the commanded pulse width of light emitter 46 via contacts 68.

A reference voltage is used to calibrate the fiber optics, emitter and detector attenuation. DC power from signal generator 22 and wire 16 is conducted to voltage regulator 30 via contacts 37. Contacts 37 modulate the voltage at the first frequency. Regulated voltage is conducted to modulator 42 as said first frequency. The pulse width modulation of switch 52 (reference voltage), and switch 54 are at the same frequency but shifted in time for detection. The pulse width for these two signals is a function of servovalve command and originate in computer 10. The two signals delivered to the computer by detector 56 are at the first frequency and are separated by time.

Computer 10 resolves servovalve current by conditioning the first frequency. The amplitude ratio of the two time separated signals corrected for pulsewidth is a function of servovalve current. The gain or flow of the servovalve is a function of servovalve current. The measured servovalve current is used to bias the pulsewidth to assure a constant servovalve gain. That gain is important to assure proper control of the aircraft (or other device being controlled). Two little gain causes poor response, while too much causes unstable surfaces which can self destruct. Also, if the actuator has two or more systems and one is lost it may be desirable to double the gain of the remaining system to compensate.

This system, thus, is capable of remotely controlling a two stage servovalve or other servoactuator, or as single stage direct drive servovalve, and a solenoid valve if desired. The system also senses both servoactuator position and servovalve position and current.

Other applications, variations and ramifications of this invention will occur to those skilled in the art upon reading this disclosure. Those are intended to be included within the scope of this invention, as defined in the appended claims.

I claim:

1. A fiber optic servoactuation system which comprises:

a plurality of light emitting means adapted to produce light signals at a plurality of wavelengths;

electrical signal generating means for providing electrical current at a plurality of selected frequencies to contacts of a plurality of electrical switches;

a direct current supply means for providing direct current to said electrical switches;

optical switch means cooperating with each electrical switch for receiving light signals from said light emitting means and closing corresponding electrical switch contacts in accordance with the wavelengths of light received;

a single optical fiber for transmitting said light signals from said light emitting means to said optical switch means;

an electrical conductor for transmitting said electrical signal from said generating means to said electrical switches;

connection means for connecting a servoactuator to said electrical switch contacts to operate said servoactuator in either of two opposite directions in response to an electrical signal from said electrical switch contacts; and computer means for controlling said light emitting means to operate said servoactuator in a selected manner.

2. The fiber optic servoactuation system according to claim 1 further including means for sensing the position of said servoactuator.

3. The fiber optic servoactuation system according to claim 1 further including means for sensing the current flow at said servoactuator.

4. The fiber optic servoactuation system according to claim 1 wherein said light emitting means comprises three light emitting diodes, each capable of emitting light at a different wavelength in response to an electrical signal.

5. The fiber optic servoactuation system according to claim 1 further including means for operating a solenoid switch.

6. A fiber optic servoactuation system for sensing the position of a servoactuator which comprises:

a computer interface system adapted to be controlled by a computer, said computer interface system comprising light emitter means to generate first, second and third light signals at first, second and third different selected wavelengths, detector means for detecting a light signal from said light emitter means at one of said wavelengths, an electrical signal generator for generating electrical signals of at least one frequency and a direct current power supply switch for controlling direct current power output;

a single fiber optic for carrying said light signals;

a single pair of electrical conductors for carrying said electrical signals and direct current power;

a servoactuator interface for receiving said light and electrical signals and adapted to control a servoactuator which comprises two linear variable differential position transformers for receiving said electrical signals and generating conditioned outputs, modulation means for receiving said conditioned outputs and the first light signal and producing a modulated output signal, optical switch means for receiving the second and third of said light signals and the modulated electrical signal and adapted to provide positive or negative output signals to a servoactuator.

7. The fiber optic servoactuation system according to claim 6 wherein each of said linear variable differential position transformer systems includes a bandpass filter for receiving the electrical signal from said single pair of wires and passing only different ones of said frequencies, a linear variable differential position transformer receiving said single frequency and means for conditioning output signal from said linear variable differential position transformer.

8. The fiber optic servoactuation system according to claim 7 wherein said variable differential position transformer system includes a frequency regulator means having a bandpass filter for receiving the electrical signal from said single pair of wires and passing only the frequency not passed to a linear variable differential position transformer to a voltage regulator and means for passing the output of said voltage regulator to said signal conditioning means.

9. The fiber optic servoactuation system according to claim 6 further including means adapted to control a solenoid valve in response to a signal from said direct current power supply switch.

10. The fiber optic servoactuation system according to claim 6 wherein said first frequency is a pulse width modulated frequency.

* * * * *